United States Patent [19]

English et al.

[11] 4,153,365

[45] May 8, 1979

[54] PORTABLE COPIER USING FLASH LAMP ARTICLE

[75] Inventors: George J. English, Reading; Timothy Fohl, Carlisle, both of Mass.

[73] Assignee: GTE Sylvania Incorporated, Stamford, Conn.

[21] Appl. No.: 893,723

[22] Filed: Apr. 5, 1978

[51] Int. Cl.² ............................................. G03B 27/04
[52] U.S. Cl. .............................. 355/99; 346/107 R; 354/108; 362/11; 362/13
[58] Field of Search ............... 354/107, 108, 142, 289; 362/11, 13; 355/113, 120, 99, 133; 346/107 R

[56] References Cited

U.S. PATENT DOCUMENTS

| | | | |
|---|---|---|---|
| 2,299,990 | 10/1942 | Jones | 355/120 |
| 2,490,338 | 12/1949 | Marin et al. | 354/107 |
| 3,452,196 | 6/1969 | Gray | 354/107 X |
| 3,488,753 | 1/1970 | Tone et al. | 354/107 X |
| 3,739,697 | 6/1973 | Miyagawa | 354/108 |
| 4,123,767 | 10/1978 | Halpern | 354/107 |

FOREIGN PATENT DOCUMENTS 2112409 9/1972 Fed. Rep. of Germany .......... 354/107

Primary Examiner—Richard A. Wintercorn
Attorney, Agent, or Firm—Lawrence R. Fraley

[57] ABSTRACT

A low-cost, portable copier for exposing a photosensitized sheet through a stencil placed thereon. The sheet and stencil, in the form of a "sandwich", are positioned on the copier's cover member which is then pivoted to a closed position against the copier's housing. A flash lamp article, including a tapered casing having a percussively-ignitable flash lamp therein, is inserted within the housing and activated by a resilient cantilever member located therein.

8 Claims, 5 Drawing Figures

U.S. Patent  May 8, 1979  4,153,365
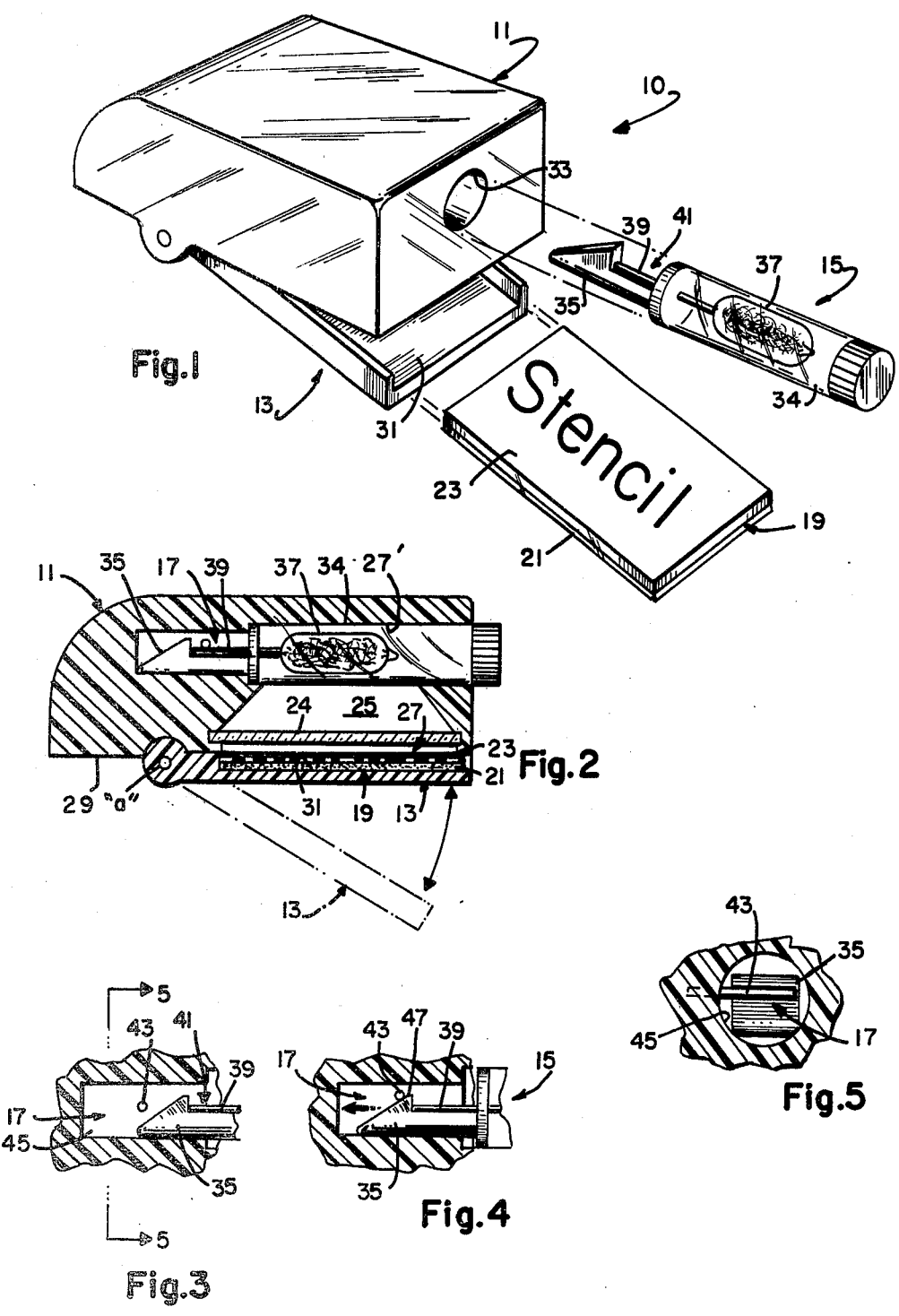

PORTABLE COPIER USING FLASH LAMP ARTICLE

CROSS-REFERENCE TO COPENDING APPLICATIONS

In copending application Ser. No. 796,795, entitled "Copy Apparatus Using Chemical Flashlamp" (Inventor: T. Fohl), there is described a portable copy apparatus which uses a chemical flash lamp. The lamp is activated by manually preenergizing the apparatus's lamp-striker spring located externally of the apparatus enclosure.

In copending application Ser. No. 812,916 entitled "Flashlamp Assembly with Tapered Housing" (Inventors: R. P. Bonazoli, W. H. Morgan), there is described a flash lamp assembly which utilizes a percussively-ignitable flash lamp. This assembly is adapted for being used within the apparatus of Ser. No. 796,795. As will be understood from the following description, the assembly of Ser. No. 812,916 is also capable of being utilized in the instant invention.

BACKGROUND OF THE INVENTION

The present invention relates to low-cost, portable copiers which utilize flash lamps as their light source.

Generally speaking, most prior art portable copiers have used electrically-activated flash lamps (e.g. xenon lamps) as the requisite source of radiant energy. A typical example is shown in U.S. Pat. No. 3,767,969 (R. B. White et al) wherein an ultraviolet imaging tape is exposed to a xenon lamp positioned a specified distance above the tape's path through the copier. Other examples of copiers using electric lamps are shown in U.S. Pat. Nos. 2,726,317 (D. B. Rogers) and 3,173,746 (M. M. Rockmore). One disadvantage of electrically-activated copiers is the ever present danger of electrical shock. There is also an inherent cost disadvantage to such devices as a result of the requirement for providing electrical components such as sockets, wiring, switches, etc, all of which are needed to accommodate an electrical lamp.

A third disadvantage particularly inherent in xenon lamp copiers is that the light output of such lamps is known to vary considerably, thus adversely affecting the exposure uniformity of the respective photosensitive material. The light output from xenon lamps may vary as much as plus or minus 25%, depending on the charge to the capacitor which powers the lamp.

To overcome the aforementioned disadvantages, the copy apparatus defined in copending application Ser. No. 796,795 was developed. Broadly speaking, this apparatus uses a fixed enclosure which may be placed atop the desired photosensized sheet and original. The light source, a chemical flash lamp, provides a more uniform output than xenon lamps to thus assure greater exposure uniformity from copy to copy. As defined, however, the apparatus of Ser. No. 796,795 does not readily lend itself to producing copies of small items such as hospital identification tags, processing labels, etc. In this context, it is most preferred to employ a copier which can be hand-held and manually fed the respective unexposed paper and stencil components. With particular regard to hospital and similar environments, it is even more preferred to have a portable copier which can be carried within the pockets of designated personnel and used at a variety of different locations.

It is believed, therefore, that a low-cost, portable copier which possesses the advantages described above would constitute a significant advancement in the art.

OBJECTS AND SUMMARY OF THE INVENTION

It is a primary object of the present invention to provide a low-cost, portable copier which utilizes a chemical flash lamp and which is particularly adapted for copying relatively small items such as hospital identification tags, processing labels, etc.

It is a further object of the invention to provide such a copier which is manually operable and which easily fits within the pocket of the designated user, thus assuring its ready availability at a variety of different locations.

In accordance with one aspect of the invention, there is provided a portable copier which includes a housing, a movable cover oriented on the housing, a flash lamp article adapted for being manually positioned within the housing, and an activation means within the housing for activating the article when it is positioned therein. The article includes a chemical flash lamp which is positioned within a casing member and which directs its radiant energy toward a photosensitized sheet and stencil located on the cover and closed against the housing.

BRIEF DESCRIPTION OF THE DRAWINGS

FIG. 1 is a perspective view of a preferred embodiment of the invention;

FIG. 2 is a side elevational view, in section, of the invention in the closed position;

FIGS. 3 and 4 are partial, side elevational views illustrating the initial steps in activating the invention; and FIG. 5 is a sectional view of the invention as taken along the line 5—5 in FIG. 3.

DETAILED DESCRIPTION OF THE PREFERRED EMBODIMENTS

For a better understanding of the present invention together with other and further objects, advantages and capabilities thereof, reference is made to the following disclosure and appended claims in connection with the above described drawings.

With particular reference to FIGS. 1 and 2, there is shown a low-cost, portable copier 10 which includes a housing 11, a cover member 13 movably oriented on housing 11, a flash lamp article 15 capable of being manually inserted within housing 11, and an activation means 17 (FIG. 2) for activating article 15 during said insertion. Copier 10 is specifically adapted for copying relatively small items such as hospital identification tags or processing labels, depicted in the drawings as numeral 19. Label 19 comprises a sheet 21 of photosensitized material having a stencil 23 located thereon. The stencil and sheet are preferably bonded together in "sandwich" form using a suitable adhesive which subsequently permits "peeling off" stencil 23 from the exposed sheet. It is understood, of course, that sheet 21 and stencil 23 need not be bonded in order to be satisfactorily utilized in copier 10. Sheet 21 is preferably a a photosensitized material sold by the E. E. du Pont de Nemours Company under the trade designation "Dylux". This material is made by the application of organic coatings containing complex organic compounds onto suitable papers and films. It is unique in that ultraviolet light is used to form permanent colored images while visible light may be used to stabilize the unimaged areas and prevent further color formation. It is also possible to produce both positive and negative images in a variety of colors. Understandably, all of the above results are obtained without the need for chemical processing. When using paper of the above variety, it is preferred to utilize an ultraviolet filter 24 (FIG. 2) to filter out all light except that within the ultraviolet frequency range. Filter 24 is located within first end portion 27 of chamber 25 and is thereby immediately adjacent label 19 when cover 13 is closed.

Copier 10 is particularly adapted for direct copy application. That is, stencil 23 is located atop sheet 21 and the exposing light passed through the stencil.

Housing 11 defines therein a central chamber 25 which includes two opposing end portions 27 and 27'. Cover 13, which is preferably pivotally mounted on one side (29) of housing 11, thereby forms a closure for first portion 27 after label 19 is located thereon (within a channel 31). In FIG. 2, cover 13 is illustrated as pivoting about an axis "a" to move from an open position (phantom) to the desired, closed position (solid). In this closed position, label 19 is oriented adjacent first end portion 27 of chamber 25.

Flash lamp article 15 is adapted for being manually inserted within end portion 27' of chamber 25 through an aperture 33 in housing 11. A preferred article 15 for use within the instant invention is the one described in the aforementioned copending application Ser. No. 812,916. As defined therein, article 15 includes a light-transmitting casing or housing 34 having a tapered end portion 35. A percussively-actuated flash lamp 37 is oriented within casing 34. Typically, lamps of this variety comprise a light-transmitting glass envelope having a combustion-supporting atmosphere therein in addition to a quantity of shredded combustible filamentary material. This lamp further includes a metallic primer tube 39 which projects from the lamp's envelope. Deformation of the primer tube causes a quantity of fulminating material therein to deflagrate up through the primer and ignite the shredded combustible material, thus effecting activation of the lamp. The result is an intense flash of light (e.g. 5000 to 12,000 lumen seconds) with a peak intensity occurring from about 5 to 15 milliseconds after initiation.

An example of a percussively-actuated flash lamp suitable for use in article 15 is defined in U.S. Pat. No. 3,535,063 (L. F. Anderson et al), which is assigned to the assignee of the instant invention.

As described in Ser. No. 812,916, primer tube 39 projects through the light-transmitting housing 34 and extends within a recess 41 formed between tapered end 35 and casing 34.

FIGS. 3-5 illustrate the preferred method of activating article 15 such that the radiant energy from the flashed lamp 37 will be directed toward label 19 to effect exposure thereof. Article 15 is shown in FIG. 2 as being located within second end portion 27' of chamber 25 in the aforedescribed firing position. In FIGS. 3 and 4, the tapered end 35 of article 15 serves to pre-energize activation means 17 during insertion of the article within end portion 27'. In the preferred embodiment of the invention, activation means 17 is a resilient cantilever member 43 (e.g. 0.020" piano wire) which is fixedly positioned within an internal wall 45 of end portion 27' (FIG. 5). Member 43 slidably engages the tapered end 35 during article insertion and is upwardly displaced until the widest portion (47) of end 35 is reached. Accordingly, the member at this location has been sufficiently pre-energized to thereafter successfully effect deformation of primer tube 39. Understandably, this deformation occurs when recess 41 becomes aligned with member 43. Article 15 is shown in FIG. 2 in the fully inserted, activated position.

Removal of article 15 is readily achieved by rotating casing 34 approximately 90° in either direction from the firing position to thereby force cantilever member 43 out of recess 41. The article may then be withdrawn from housing 11. To facilitate the aformentioned activation procedure, various means may be provided for assuring alignment of article 15 within housing 11. For example, opening 33 could include a pair of slots therein which align with a corresponding key or rib located in casing 34 during insertion and removal. These slots would of course be offset at the described angle of 90°. Other alignment means are also possible and are considered within the ambit of the instant invention. Accordingly, further description is not considered necessary.

The preferred material for housing 11 and cover 13 is plastic, e.g. acryllic and styrene. This material is also preferred for casing 34 and end 35 of article 15. The materials for flash lamp 37 are well known in the art.

As stated, copier 10 is particularly adapted for copying relatively small items such as hospital identification tags, processing labels, etc. In one example, labels 19 having rectangular dimensions of about 1.00 inch by 0.75 inch and a thickness of 0.005 inch were copied.

Thus there has been shown and described a low-cost, portable copier which readily lends itself to manual operation and to copying of small items. The invention as defined further is adaptable for being carried within the pocket of the designated user. In one embodiment of the invention the copier in the closed position (FIG. 2) had an overall length of 2.0 inches, a width of about 1.0 inch, and a height of about 1.0 inch.

While there have been shown and described what are at present considered the preferred embodiments of the invention, it will be obvious to those skilled in the art that various changes and modifications may be made therein without departing from the scope of the invention as defined by the appended claims.

What is claimed is:

1. A portable copier for exposing a sheet of photosensitized material through a stencil, said copier comprising:

a housing defining a chamber therein, said chamber including first and second opposing end portions;

a cover member movably oriented on said housing and adapted for forming a closure for said first end portion of said chamber, said cover member adapted for having said photosensitized sheet and said stencil located thereon whereby said sheet and stencil will be positioned adjacent said first end portion of said chamber when said cover member forms said closure therefor;

a flash lamp article adapted for being manually positioned within said second end portion of said chamber, said flash lamp article including a casing member and a chemical flash lamp positioned therein; and activation means located within said second end portion of said chamber for activating said chemical flash lamp when said flash lamp article is positioned within said second end portion, the radiant energy from said flash lamp being directed toward said photosensitized sheet and stencil.

2. The portable copier according to claim 1 wherein said housing and said cover member are plastic.

3. The portable copier according to claim 1 including an ultraviolet filter located within said first end portion of said chamber, said filter being oriented between said flash lamp article and said photosensitized sheet and stencil when said cover member forms said closure for said first end portion of said chamber 4. The portable copier according to claim 1 wherein said cover member is pivotally oriented on one side of said housing.

5. The portable copier according to claim 4 wherein said cover member includes a channel therein for receiving said photosensitized sheet and stencil.

6. The portable copier according to claim 1 wherein said chemical flash lamp is percussively-ignitable and includes a light-transmitting envelope having a qunatity of combustible material therein and a primer tube projecting from said envelope and through said casing, said activation means adapted for mechanically striking said primer tube.

7. The portable copier according to claim 6 wherein said activation means comprises a resilient cantilever member.

8. The portable copier according to claim 7 wherein said casing includes a tapered end portion for pre-energizing said resilient cantilever member prior to said activation of said chemical flash lamp.

* * * * *